United States Patent
Xiao et al.

(10) Patent No.: US 11,470,272 B1
(45) Date of Patent: Oct. 11, 2022

(54) CMOS IMAGE SENSING WITH SAMPLED BANDGAP REFERENCE

(71) Applicant: SHENZHEN GOODIX TECHNOLOGY CO., LTD., Shenzhen (CN)

(72) Inventors: Jinwen Xiao, San Diego, CA (US); Scott D Willingham, San Diego, CA (US)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/338,607

(22) Filed: Jun. 3, 2021

(51) Int. Cl.
  *H04N 5/369* (2011.01)
  *H04N 5/378* (2011.01)
  *H04N 5/357* (2011.01)
  *H04N 5/3745* (2011.01)

(52) U.S. Cl.
  CPC .......... *H04N 5/3698* (2013.01); *H04N 5/357* (2013.01); *H04N 5/378* (2013.01); *H04N 5/37457* (2013.01); *H04N 5/3575* (2013.01)

(58) Field of Classification Search
  CPC .... H04N 5/357; H04N 5/3575; H04N 5/3698; H04N 5/37457; H04N 5/378
  See application file for complete search history.

(56) References Cited

U.S. PATENT DOCUMENTS

| | | | | |
|---|---|---|---|---|
| 11,303,293 B1* | 4/2022 | Elsayed | ................ | H04N 5/363 |
| 11,363,228 B1* | 6/2022 | Elsayed | ................ | H04N 5/357 |
| 2020/0412993 A1* | 12/2020 | Kawazu | ................ | H04N 5/379 |

* cited by examiner

*Primary Examiner* — Daniel M Pasiewicz
(74) *Attorney, Agent, or Firm* — Kilpatrick Townsend & Stockton LLP

(57) ABSTRACT

Techniques are described for sampled bandgap reference generation for CMOS image sensor (CIS) applications. For example, the CIS includes a pixel array, one or more pixel analog to digital converters (ADCs), and a sampled bandgap reference generator, all integrated in close proximity on a chip. The ADCs rely on stable reference levels from the bandgap reference generator for performing pixel conversions for the pixel array. Embodiments of the sampled bandgap reference generator can operate according to reference generation cycles. Each cycle can include a first portion, in which an active core dynamically stabilizes the bandgap reference level; and a second portion, in which the core is deactivated, and the bandgap reference level is output based on a sampled level obtained during the preceding first portion of the cycle. The cycle timing can be controlled to achieve sufficient dynamic stabilization of the reference levels, while mitigating photon emissions from the core.

20 Claims, 5 Drawing Sheets

CMOS IMAGE SENSING WITH SAMPLED BANDGAP REFERENCE

FIELD

The invention relates generally to image sensors. More particularly, embodiments relate to image sensing, using complementary metal-oxide semiconductor (CMOS) image sensors, based on sampled bandgap reference levels.

BACKGROUND

Many electronic devices include cameras and other features that rely on digital image sensors. For example, most modern smartphones include one or more digital cameras that rely on digital image sensing hardware and software to capture and process images. Such applications often perform image sensing using a complementary metal-oxide semiconductor (CMOS) image sensor (CIS). Over time, consumers have desired increased performance from these image sensors, including higher resolution and lower noise. Further, particularly in portable electronic devices (e.g., with fixed battery capacity), it has been desirable to provide such features without adversely impacting power consumption and dynamic range. For example, analog power drives a significant, if not dominant, part of the power consumption of a modern CIS. As such, implementing a high-performance CIS in a portable electronic device can involve designing analog-to-digital converters (ADCs) and other components within strict power efficiency and noise constraints.

The ADCs in the CMOS image sensors convert analog pixel information into digital code. Conventional architectures typically include a ramp-based ADC that compares an analog pixel output voltage (corresponding to signal intensity detected by the pixel) against a reference ramp voltage. Typically, a same ramp voltage is shared across an entire row of pixels. As modern image sensors can typically include thousands of pixels in each row, there can typically be thousands of comparators being used in the row for analog-to-digital conversion, all based on the same ramp voltage. Proper operation of the ADCs can depend on providing stable and consistent reference levels (e.g., reference voltages) to components over time, even with shifts in operating temperature, supply voltage levels, etc. However, conventional approaches to providing such reference levels can produce photon emissions that can impact operation of photosensitive elements of the CIS.

BRIEF SUMMARY OF THE INVENTION

Embodiments provide dynamically stabilized reverence level generation for complementary metal-oxide semiconductor (CMOS) image sensor (CIS) applications using sampled bandgap reference generation. For example, the CIS includes a pixel array, one or more pixel analog to digital converters (ADCs), and a sampled bandgap reference generator, all integrated in close proximity on a chip. The ADCs rely on stable reference levels from the bandgap reference generator for performing pixel conversions for the pixel array. Embodiments of the sampled bandgap reference generator can operate according to reference generation cycles. Each cycle can include a first portion, in which an active core dynamically stabilizes the bandgap reference level; and a second portion, in which the core is deactivated, and the bandgap reference level is output based on a sampled (memorized) level obtained during the preceding first portion of the cycle. During each first portion, operation of the active core can cause photon emissions, which can adversely impact detection by the pixel array; but such emission is not present during each second portion. As such, embodiments balance timing of the first and second portions to achieve sufficient dynamic stabilization of the reference levels, while mitigating photon emissions.

According to one set of embodiments, a method is provided for pixel conversion in a complementary metal-oxide semiconductor (CMOS) image sensor. The method includes: receiving, by a pixel analog to digital converter (ADC) from a plurality of photodetectors of a pixel array, a plurality of analog pixel response signals; outputting a bandgap reference level by, for each of a plurality of reference generation cycles: activating a bandgap core of a sampled bandgap reference generator for a first portion of the reference generation cycle to generate and output the bandgap reference level as a dynamically stabilized bandgap reference level; sampling the dynamically stabilized bandgap reference level during the first portion of the reference generation cycle to obtain a held bandgap reference level; and for a second portion of the reference generation cycle, deactivating the bandgap core and outputting the bandgap reference level based on the held bandgap reference level; and converting, by the pixel ADC, the plurality of analog pixel response signals based at least on the bandgap reference level to generate a plurality of digital pixel output signals.

According to another set of embodiments, a CMOS image sensor system is provided. The system includes: a pixel array having a plurality of photodetectors configured to output a plurality of analog pixel response signals indicative of detected intensities of illumination across the plurality of photodetectors; a pixel analog to digital converter (ADC) coupled with the pixel array to convert the plurality of analog pixel response signals a plurality of digital pixel output signals based at least on a bandgap reference level; and a sampled bandgap reference generator to output the bandgap reference level. The outputting of the bandgap reference cycle is performed, for each of multiple reference generation cycles, by: activating a bandgap core of the sampled bandgap reference generator for a first portion of the reference generation cycle to generate and output the bandgap reference level as a dynamically stabilized bandgap reference level; sampling the dynamically stabilized bandgap reference level during the first portion of the reference generation cycle to obtain a held bandgap reference level; and for a second portion of the reference generation cycle, deactivating the bandgap core and outputting the bandgap reference level based on the held bandgap reference level.

BRIEF DESCRIPTION OF THE DRAWINGS

The accompanying drawings, referred to herein and constituting a part hereof, illustrate embodiments of the disclosure. The drawings together with the description serve to explain the principles of the invention.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Figure 1:
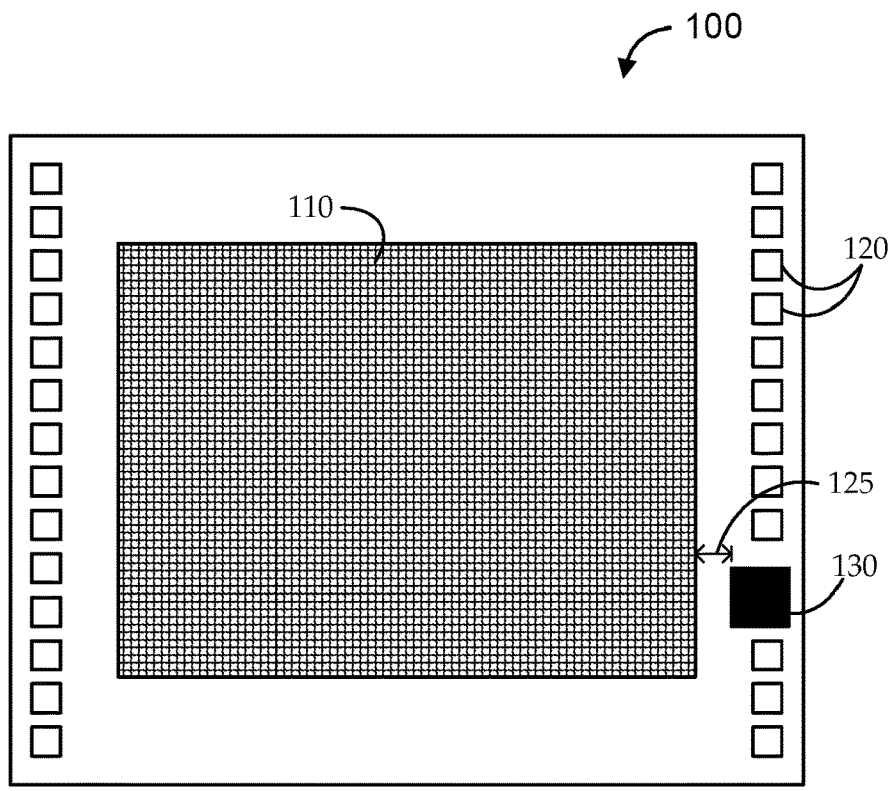
FIG. 1 shows an illustrative highly simplified layout of a complementary metal-oxide semiconductor (CMOS) image sensor chip, according to various embodiments described herein.

FIG. 1 shows an illustrative highly simplified layout of a complementary metal-oxide semiconductor (CMOS) image sensor chip 100, according to various embodiments described herein. The chip 100 generally includes a pixel area 110 surrounded by circuitry. The pixel area 110 is a large array of photosensitive elements, such as photodiodes, and/or other photo-sensor components. During operation, the photosensitive elements in the pixel area 110 are configured to detect illumination at one or more frequencies and to generate an output signal indicative of the intensity of the detected illumination. The surrounding circuitry is configured to provide various related functionality, such as converting the pixel output signals into digital data, providing various types of on-board processing of signals, generating and/or regulating power to components of the chip 100, etc. For the sake of simplicity (i.e., rather than showing specific circuit configurations, etc.), the circuit area is shown mostly as bond pads 120 distributed over regions of the sensor chip 100 peripheral to the pixel area 110.

Accurate functioning of CMOS image sensors can rely on maintaining stable voltage and/or current reference levels. For example, analog output signals from the pixels of the pixel area 110 are converted into digital signals based at least on reference levels, and many CMOS image sensor applications rely on reference levels remaining stable even with changes in operating conditions. In general, bandgap reference circuits have been used to generate such stable reference voltages or currents that are independent of temperature variations during operation of connected circuits. Some bandgap reference circuits are further designed to maintain a substantially constant reference even with variations in power supply, loading from connected circuits, and certain other process variations. Many typical bandgap reference circuits generate an output voltage of around 1.2 volts, corresponding to the theoretical band gap of silicon used in circuit components of the bandgap reference circuit.

Figure 2:
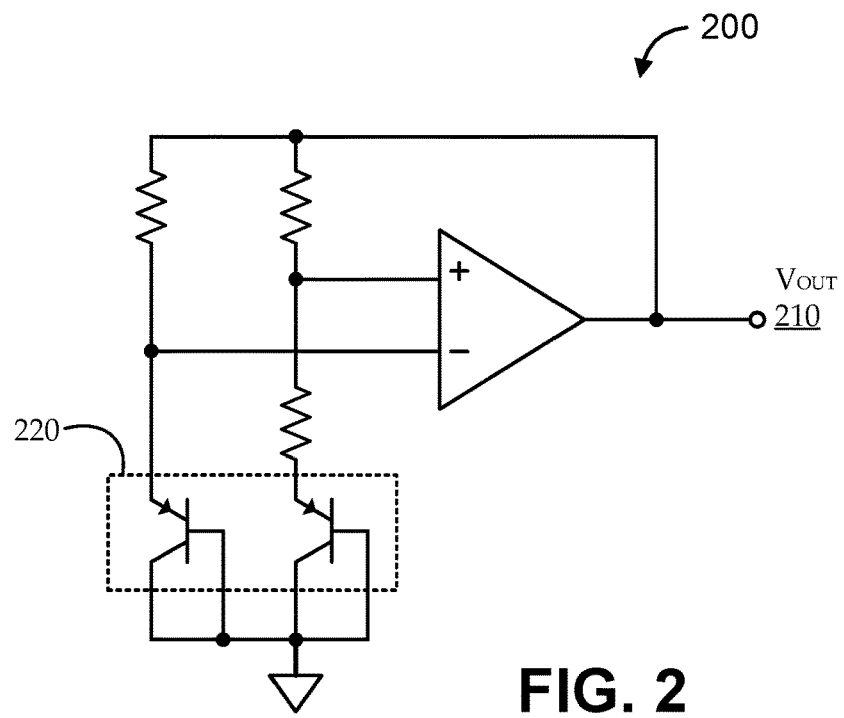
FIG. 2 shows a conventional continuously running bandgap voltage generator.

For added context, FIG. 2 shows a conventional continuously running bandgap voltage generator 200. In many circuits for which it is desirable to maintain constant reference levels, it is typical to use such a continuously running bandgap voltage generator 200. During its continuous operation, the continuously running bandgap voltage generator 200 is in a constant state of feedback control. As such, the continuously running bandgap voltage generator 200 can continue to dynamically responding to any changes in operating condition, thereby maintaining output of a highly stable output voltage 210 (e.g., or other stable reference level) over time. For example, bipolar junction transistors (BJTs) 220 (e.g., or other suitable p-n junction devices) in the continuously running bandgap voltage generator 200 are configured, along with a resistor network, to generate two branches of PTAT (proportional to absolute temperature) currents. Hence the voltages across all resistors have PTAT dependence, while the voltages across the BJTs have well known CTAT (complementary to absolute temperature) dependence. The resistor ratios are selected to cancel the first-order PTAT and CTAT voltage dependencies at the output. As a result, the output voltage 210 of the bandgap voltage generator 200 tends to be relatively invariable over a relatively large range of temperatures and supply voltages (e.g., the output voltage varies by less than 1 percent over its designed operating range).

Returning to FIG. 1, a sampled bandgap reference generator 130 is illustrated as integrated in the peripheral region of the sensor chip 100 via the bond pads 120. As described herein, the sampled bandgap reference generator 130 does not operate continuously, as does the continuously running bandgap voltage generator 200 of FIG. 2. During operation of such a continuously running bandgap voltage generator 200, the BJTs 220 can tend to emit photons, including emitting photons with long wavelengths. For typical electronics applications, such photon emission has no practical impact on operation of connected or surrounding circuits. However, such photon emission may impact operation in certain CMOS image sensor contexts, such as in context of the CMOS image sensor chip 100. It can be seen that the vast majority of the area of the sensor chip 100 is consumed by the pixel area 110, leaving only a limited peripheral area around the large pixel area 110. As such, when the sampled bandgap reference generator 130 is integrated with the chip, there may only be a small maximum spacing (illustrated as arrow 125) between the sampled bandgap reference generator 130 and some pixels of the pixel area 110.

Because the pixel area 110 is designed to be sensitive to photons, prolonged exposure to photon emissions, as can result from use of a continuously running bandgap voltage generator 200, can impact operation of at least some pixels of the CMOS image sensor. Embodiments described herein use sampled bandgap reference generation (e.g., the sampled bandgap reference generator 130 illustrated in FIG. 1) at least to reduce the pixel array's potential exposure to photon emissions from bandgap reference generation. Embodiments operate the sampled bandgap reference generator 130 non-continuously, so that photons are being emitted only for relatively short amounts of time. The reference level generated by the sampled bandgap reference generator 130 can be memorized (e.g., sampled and held) when the sampled bandgap reference generator 130 is on, and the memorized level can be used as a sufficiently stable reference during the times when the sampled bandgap reference generator 130 is turned off.

Figure 3:
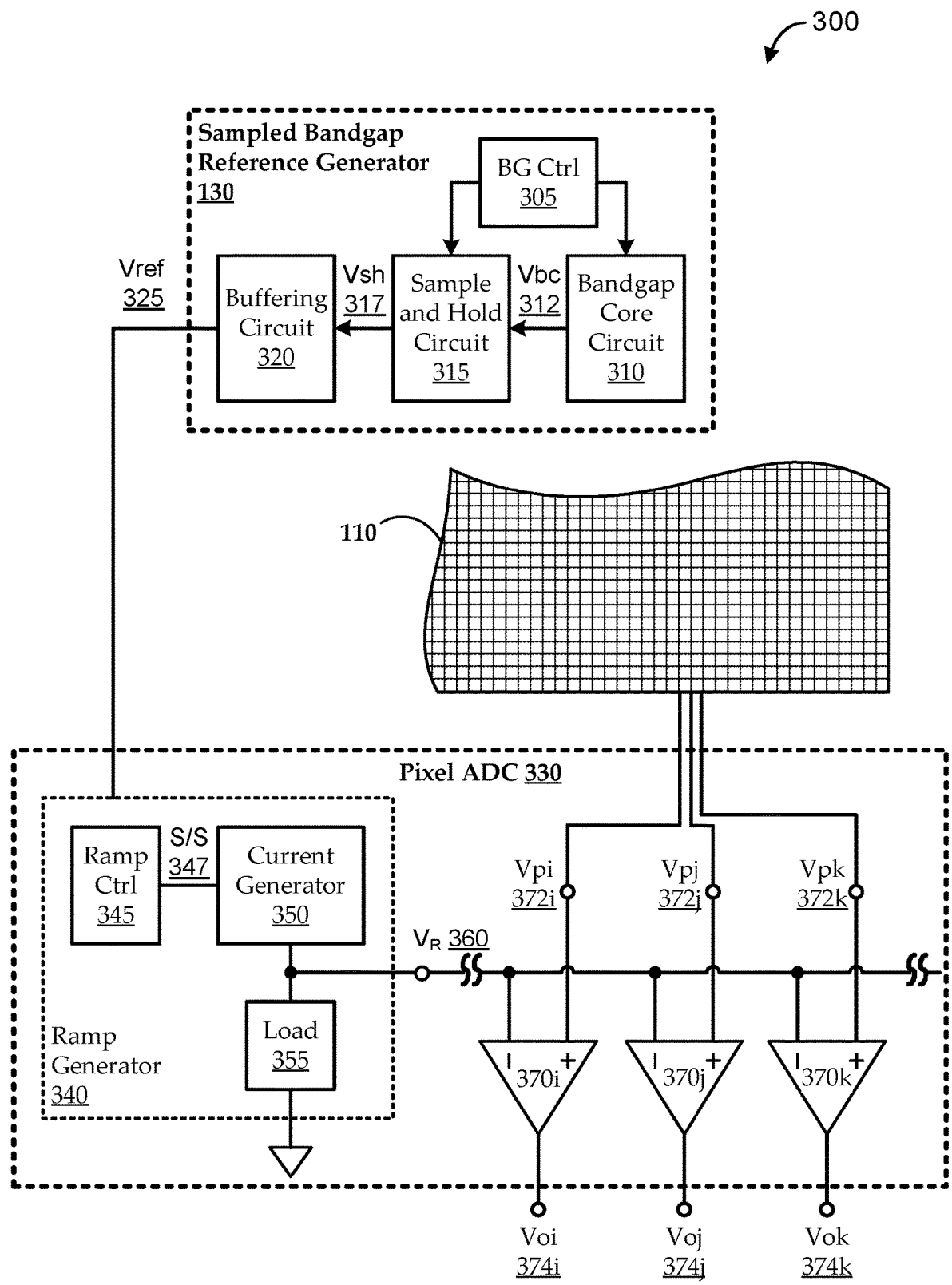
FIG. 3 shows a portion of an illustrative CMOS image sensor system, according to various embodiment herein.

FIG. 3 shows a portion of an illustrative CMOS image sensor system 300, according to various embodiment herein. As illustrated, the CMOS image sensor system 300 includes a sampled bandgap reference generator 130, a pixel area 110, and a pixel analog-to-digital converter (ADC) 330. Other circuits of the CMOS image sensor system 300 are not shown, and each of the sampled bandgap reference generator 130 and the pixel ADC 330 are shown in a simplified form, to avoid overcomplicating the illustration.

As described above, the pixel area 110 can be an array of photosensitive elements, such as photodiodes. Typically, each element of the array (i.e., each pixel) generates an analog output signal (Vp) 372 responsive to detecting a light energy. For example, a single pixel may include a pattern of four photodiodes that are each sensitive to a particular color of light (e.g., frequency band), and the analog level of the respective Vp 372 generated by each photodiode is indicative of the intensity of light energy detected at the corresponding color. One or more instances of the pixel ADC 330 are coupled with the pixel area 110 to convert the Vp 372 levels into digital values for use by downstream digital processing circuits. As illustrated, the pixel ADC 330 includes a pixel ramp voltage generator 340 coupled with a number of comparators 370.

The pixel ramp voltage generator 340 generates a ramp voltage (Vr) 360, which can essentially be a voltage that begins at a low starting level and charges to a high ending level in a substantially linear fashion (e.g., or begins at a high starting level and discharges to a low ending level in a substantially linear fashion). A simplified block diagram of the conventional pixel ramp voltage generator 340 is illustrated as including a ramp controller 345, a current generator 350, and a load 355. To generate Vr 360, the ramp controller 345 can assert a ramp start signal 347. For example, a start/stop (S/S) signal is used, where ramp start corresponds to one state of the signal (e.g., HIGH), and ramp stop corresponds to the complementary state of the signal (e.g., LOW). In response to the ramp start signal 347, the current generator 350 begins flowing a charging current through the load 355, which charges the load 355. As one example, the current generator 350 includes transistors, or the like, to inject a substantially constant charging current into a capacitive load 355. Injecting the charging current into the load 355 can cause the voltage across the capacitive load 355 (corresponding to Vr 360) to increase substantially linearly with time. Similar techniques can be used, alternatively, to cause the voltage across the capacitive load 355 (corresponding to Vr 360) to decrease substantially linearly with time (e.g., by causing the load 355 to discharge in a substantially linear fashion). As another example, the current generator 350 includes a programmable current source (e.g., a current digital-to-analog converter controlled by an input code) to inject a changing charging current into a resistive load 355. The input code, or other control of the programmable current source is adjusted over the ramp cycle, such that the changing charging current injected into the load 355 cause the voltage across the resistive load 355 (corresponding to Vr 360) to increase or decrease substantially linearly with time.

The output of the pixel ramp voltage generator 340 (i.e., Vr 360), is coupled with a first input (e.g., the negative input) of each of the comparators 370. For example, in this way, the same ramp voltage is shared across all comparators 370 of a row of pixels of the pixel area 110. The other input (e.g., the positive input) of each of the comparators 370 is coupled with a respective Vp 372 for a corresponding pixel. As noted above, each Vp 372 is an analog output of the pixel (or element of a pixel) corresponding to the intensity of light (e.g., number of photons) detected by the pixel. For the sake of illustration, three comparators 370 are shown, corresponding to three adjacent pixels in a row. The comparators 370 are indicated sequentially as 370i, 370j, and 370k; and the respective pixel output voltages 372 are indicated sequentially as 372i, 372j, and 372k. Each comparator 370 compares its respective Vp 372 input to Vr 360. Vr 360 can be configured so that the ramp begins at a level assumed to be below Vp 372, and so that the ramp ends at a level assumed to be above any Vp 372. At some point in a pixel conversion cycle, the linearly changing level of Vr 360 will cross the level of the Vp 372, thereby triggering a change in state of the corresponding comparator output Vo 374. As different levels of Vp 372 will result in different timing for the state change at the output of the comparator 370, the timing of the transition at Vo 374 can be used as a measure of the corresponding Vp 372. For example, a digital counter can be used to count an elapsed time from the beginning of the ramp until the transition in Vo 374, and the final count can be a digital representation of the analog value of Vp 372.

Proper operation of the pixel ADC 330 can depend on having a stable reference from which to generate the ramp. As illustrated, this stable reference can be provided by the sampled bandgap reference generator 130. The illustrated sampled bandgap voltage generator 130 includes a bandgap controller 305, a bandgap core circuit 310, a sample and hold circuit 315, and a buffering circuit 320. The bandgap core circuit 310 can include similar components to the bandgap voltage generator 200 of FIG. 2. However, the bandgap core circuit 310 is configured with switches to selectively activate and deactivate its functionality. For example, the bandgap core circuit 310 outputs a bandgap core voltage (Vbc) 312. When the bandgap core circuit 310 is activated (i.e., is operating, is turned ON, is in an ON state, etc.) Vbc 312 is a stable reference voltage. When the bandgap core circuit 310 is deactivated (i.e., is not operating, is turned OFF, is in an OFF state, etc.) Vbc 312 is pulled to ground, or is otherwise not the stable reference voltage.

The sample and hold circuit 315 is coupled with the bandgap core circuit 310 to generate a sample/hold voltage Vsh 317 based on Vbc 312. Generating Vsh 317 can involve sampling Vbc 312 while the bandgap core circuit 310 is operating, and holding the sampled Vbc 312 for use as a reference while the bandgap core circuit 310 is not operating. For example, while the bandgap core circuit 310 is ON, the output of the sample and hold circuit 315 reflects the output of the bandgap core circuit 310 (i.e., Vsh 317 tracks Vbc 312); while the bandgap core circuit 310 is OFF, the output of the sample and hold circuit 315 is held at the previously sampled reference level and does not continue to dynamically adjust to changes in operating environment (e.g., change in temperature, supply level, etc.). The output of the sample and hold circuit 315 (Vsh 317) can be coupled with the buffering circuit 320. The buffering circuit 320 generates one or more buffered (e.g., low output impedance) instances of Vsh 317 as a respective bandgap reference voltage (Vref) 325.

The bandgap controller 305 can control timing of various signals used by the sampled bandgap reference generator 130, as described herein. For example, as described herein, the bandgap controller 305 controls on and off timing of the sampled bandgap reference generator 130, so that the sampled bandgap reference generator 130 is on for a sufficient portion of the time to maintain a stable reference for other circuits (e.g., for the pixel ADC 330), but is off for a sufficient portion of the time to reduce exposure of the pixel area 110 to photon emissions. Embodiments of the bandgap controller 305 can be implemented in any suitable manner. For example, the bandgap controller 305 can include, or can be implemented on, a central processing unit CPU, an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set (RISC) processor, a complex instruction set processor (CISC), a microprocessor, or the like, or any combination thereof. In some implementations, the bandgap controller 305 is implemented separate from the sampled bandgap reference generator 130. For example, the bandgap controller 305 is implemented as part of a controller, processor, or other component that is shared by one or more other circuits. In other implementations, the bandgap controller 305 is integrated with the sampled bandgap reference generator 130, as illustrated. For example, the bandgap controller 305 is implemented as a state machine, a simple processor, a set of digital logic, or in any other suitable manner.

The ON and OFF durations of the bandgap core circuit 310 can be controlled by the bandgap controller 305 to balance competing design considerations. During the ON duration, the bandgap core circuit 310 is able to maintain a stable reference voltage even with fluctuations in temperature, power supply, etc.; but the bandgap core circuit 310 also emits photons that may adversely impact operation of nearby photosensitive circuits. During the OFF duration, the reference voltage is allowed to drift with fluctuations in temperature, power supply, etc.; but the bandgap core circuit 310 is not emitting photons. Depending on the operating environment, surrounding circuit sensitivities, and/or other factors, embodiments can be designed to seek an appropriate balance between mitigating reference drift (i.e., by increasing the proportion of time that the bandgap core circuit 310 is ON) and mitigating photon emission (i.e., by decreasing the proportion of time that the bandgap core circuit 310 is ON). In some implementations, an optimization routine is run during simulations of the circuit design (e.g., simulation of the entire CMOS image sensor chip, or some portion thereof) to determine expected amounts and rates of thermal drift; and the ON timing of the bandgap core circuit 310 is optimized to be as short as possible without violating a maximum reference drift specification.

Figure 4:
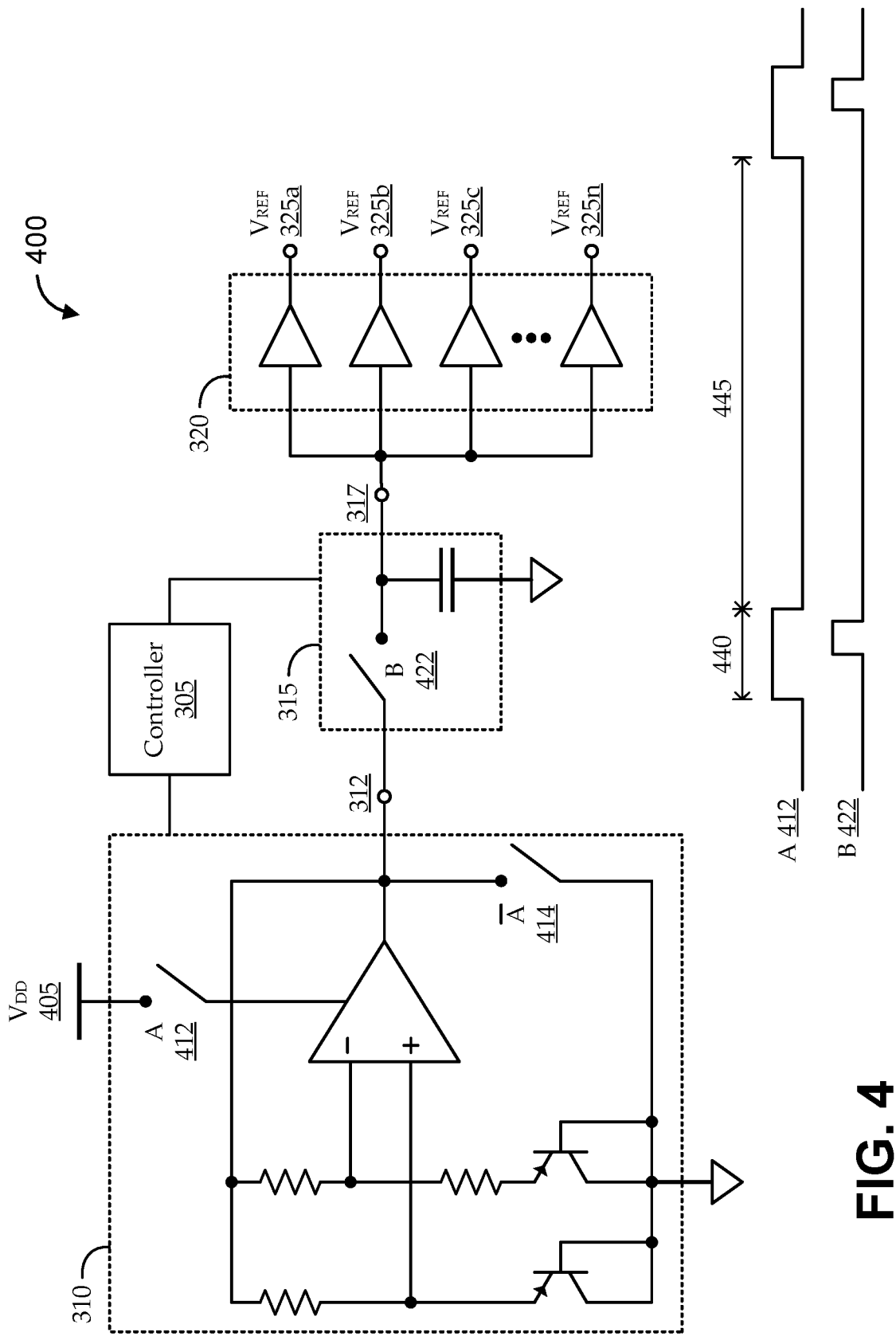
FIG. 4 shows an illustrative implementation of a sampled bandgap voltage generator using an analog sample and hold circuit, according to various embodiments.

The sampled bandgap reference generator 130 illustrated in FIG. 3 can be implemented in various ways. FIG. 4 shows an illustrative implementation of a sampled bandgap voltage generator 400 using an analog sample and hold circuit 315, according to various embodiments. The sampled bandgap voltage generator 400 can be an implementation of the sampled bandgap reference generator 130 of FIG. 3. The illustrated sampled bandgap voltage generator 400 includes a bandgap core circuit 310, a sample and hold circuit 315, and a buffering circuit 320. The bandgap core circuit 310 is selectively activated or deactivated by means of one or more switches. As illustrated, a first switch (A) 412 selectively couples the operational amplifier of the bandgap core circuit 310 to a supply voltage (Vdd) 405, and a second switch (A) 414 selectively pulls the output voltage (Vbc) 312 (also the output of the operational amplifier) to ground. The switches 412, 414 are coupled with complementary signals, so that the second switch is OFF when the first switch is ON, and the second switch is ON when the first switch is OFF.

The sample and hold circuit 315 is illustrated as including a third switch (B) 422 coupled with a storage element (e.g., a capacitor). When the third switch 422 is turned ON, Vbc 312 of the bandgap core circuit 310 is sampled onto the storage element (e.g., the capacitor is charged by Vbc 312). When the third switch 422 is turned OFF, a sample of Vbc 312 is held on the storage element and is isolated from Vbc 312 at the output of the bandgap core circuit 310. The voltage being sampled and/or held by the sample and hold circuit 315 (i.e., Vsh 317) can be passed to the inputs of any suitable number of buffers of a buffering circuit 320. For example, the buffering circuit 320 can include multiple unity buffers, each outputting an instance of the Vsh 317 as a respective bandgap reference voltage (Vref) 325. Each buffer can effectively provide a low-output-impedance node from the perspective of other circuits using a respective one of the Vref 325 outputs.

As illustrated, the bandgap core circuit 310 and the sample and hold circuit 315 can be coupled with, and controlled by, a bandgap controller 305. The bandgap controller 305 can control timing of various signals used by the sampled bandgap voltage generator 400, such as signals that activate and deactivate switch 412, switch 414, and switch 422. A highly simplified timing diagram is shown, including a first plot representing the switch timing of switch A 412, and a second plot illustrating the switch timing of switch B 422 (e.g., as controlled by bandgap controller 305). In the example timing, switch A 412 is ON (i.e., and) during an ON duration 440, and is OFF during an OFF duration 445, and the ON duration 440 is significantly shorter than the OFF duration 445. As such, the bandgap core circuit 310 is operating for only a small percentage of the time (e.g., less than a quarter of the time), and it is not operating otherwise. During the ON duration, switch B 422 can be switched ON and back OFF, so that the sample and hold circuit 315 is connected to and then disconnected from the bandgap core circuit 310 during the ON duration 440. As such, the sample and hold circuit 315 can sample Vbc 312 while the bandgap core circuit 310 is ON, and the sample and hold circuit 315 can then hold the sampled Vbc 312 (as Vsh 317) at least while the bandgap core circuit 310 is OFF.

Figure 5:
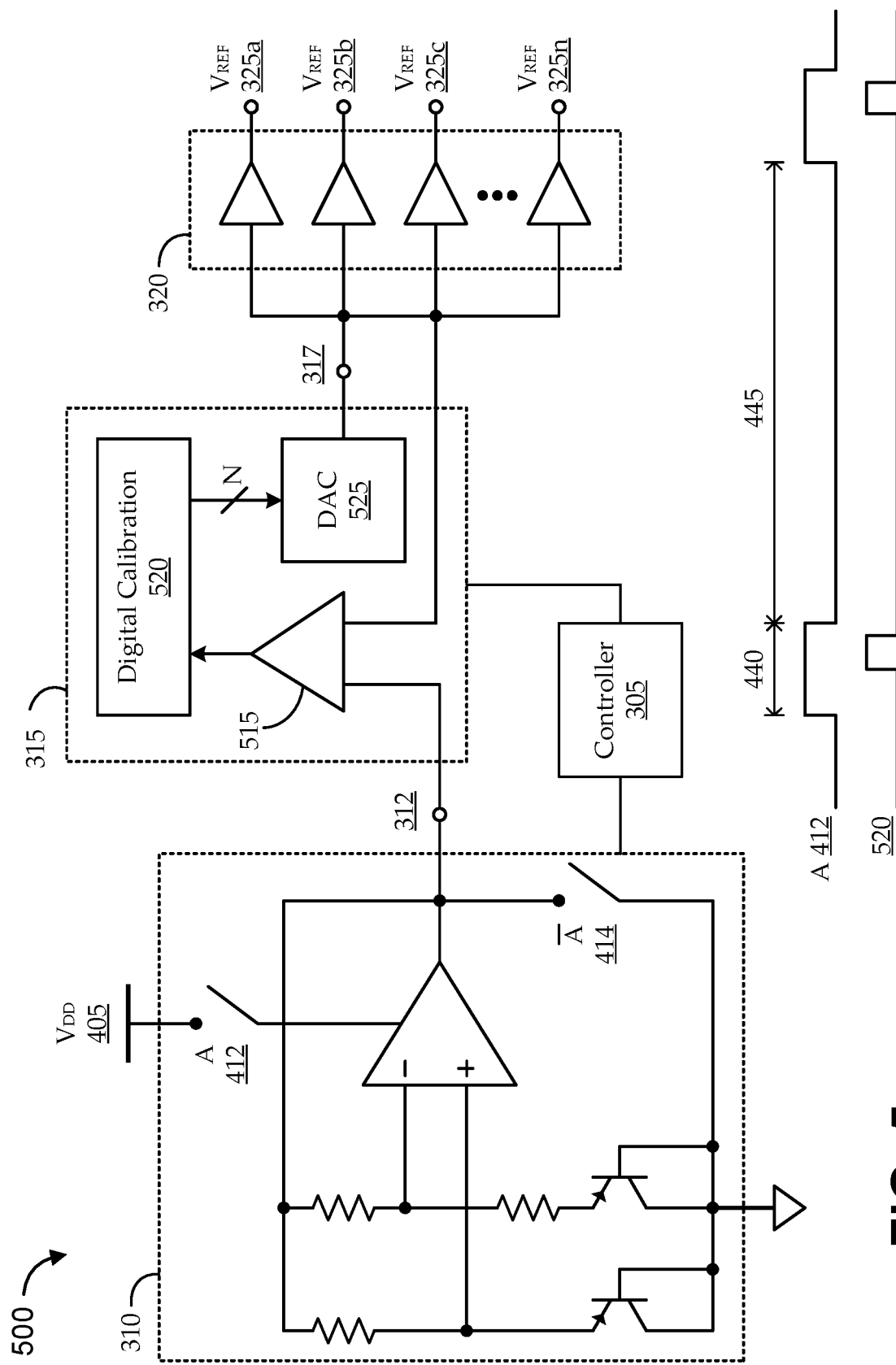
FIG. 5 shows another illustrative implementation of a sampled bandgap voltage generator that includes a digital sample and hold circuit, according to various embodiments.

FIG. 5 shows another illustrative implementation of a sampled bandgap voltage generator 500 that includes a digital sample and hold circuit 315, according to various embodiments. The sampled bandgap voltage generator 500 can be an implementation of the sampled bandgap reference generator 130 of FIG. 3. The illustrated sampled bandgap voltage generator 500 includes the bandgap core circuit 310, a digital implementation of the sample and hold circuit 315, and the buffering circuit 320. The bandgap core circuit 310 and the buffering circuit 320 can be implemented substantially as in FIG. 4. For example, as illustrated, a first switch (A) 412 selectively couples the operational amplifier of the bandgap core circuit 310 to a supply voltage (Vdd) 405, and a second switch (A) 414 selectively pulls the output voltage (Vbc) 312 (also the output of the operational amplifier) to ground. The switches 412, 414 are coupled with complementary signals, so that the second switch is OFF when the first switch is ON, and the second switch is ON when the first switch is OFF.

The digital implementation of the sample and hold circuit 315 is illustrated as including a comparator 515, a digital calibration engine 520, and a digital to analog converter (DAC) 525. The digital calibration engine 520 outputs an N-bit digital code that sets the output of the DAC 525 to output a particular output voltage (i.e., Vsh 317). For example, there is a linear relationship between the digital code input to the DAC 525 and the analog voltage output by the DAC 525. The output voltage from the DAC 525 is the Vsh 317 that is input to the buffers of the buffering circuit 320 to generate respective bandgap reference voltages (Vref) 325. The comparator 515 is configured to compare the Vbc 312 output by the bandgap core circuit 310 with the Vsh 317 output by the DAC 525. The digital calibration engine 520 takes the output of the comparator 515 as an input and can adjust its digital code output based on the comparison results. For example, if the output of the comparator 515 indicates that the output voltage from the DAC 525 is higher than the output voltage from the bandgap core circuit 310, the digital calibration engine 520 can decrement its digital code to decrease the output voltage from the DAC 525; and if the output of the comparator 515 indicates that the output voltage from the DAC 525 is lower than the output voltage from the bandgap core circuit 310, the digital calibration engine 520 can increment its digital code to increase the output voltage from the DAC 525.

As described above, the sampled bandgap voltage generator 500 is configured so that the bandgap core circuit 310 is switched ON and OFF. For example, the bandgap core circuit 310 is switched according to one or more switching signals having a duty cycle configured, so that the bandgap core circuit 310 is OFF appreciably more than it is ON. While the bandgap core circuit 310 is OFF (i.e., while the first switch is OFF and the second switch is ON), the digital calibration engine 520 is configured to maintain its digital code output, so that the DAC 525 continues to generate an analog output voltage, accordingly. During that period of time, there will be no temperature compensation, etc. While the bandgap core circuit 310 is ON (i.e., while the first switch is ON and the second switch is OFF), the digital calibration engine 520 is configured to read the comparator 515 output and to adjust its digital code if there is a discrepancy. For example, if there has been any drift in the DAC 525 output relative to the bandgap core circuit 310 output since the last time the bandgap core circuit 310 was ON (e.g., due to thermal drift, etc.) the drift will be indicated by the comparator 515 output, and the digital calibration engine 520 will adjust its code, accordingly.

As described above and as illustrated, the bandgap core circuit 310 and the sample and hold circuit 315 can be coupled with, and controlled by, the bandgap controller 305. The bandgap controller 305 can control timing of various signals used by the sampled bandgap voltage generator 500, such as signals that activate and deactivate switch 412, switch 414, and digital calibration engine 520. A highly simplified timing diagram is shown, including a first plot representing the switch timing of switch A 412, as in FIG. 4. The second plot is labeled to indicate operational timing of the digital calibration engine 520. In the example timing, switch A 412 is ON (i.e., and) during an ON duration 440, and is OFF during an OFF duration 445, and the ON duration 440 is significantly shorter than the OFF duration 445. As such, the bandgap core circuit 310 is operating for only a small percentage of the time (e.g., less than a quarter of the time), and it is not operating otherwise. During a portion of the ON duration 440, as described above, the digital calibration engine 520 operates to "sample" the comparator 515 output to update its digital code output, accordingly. Prior to the end of the ON duration 440, the digital calibration engine 520 stops adjusting its digital code and maintains a same digital code output (i.e., "holds") over at least the subsequent OFF duration 445. As such, the digital sample and hold circuit 315 can sample the output voltage 312 of the bandgap core circuit 310 while the bandgap core circuit 310 is ON, and can then hold the sampled output voltage at least while the bandgap core circuit 310 is OFF.

Embodiments of the digital calibration engine 520 can be implemented in any suitable manner. For example, the digital calibration engine 520 can include, or can be implemented on, a central processing unit CPU, an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set (RISC) processor, a complex instruction set processor (CISC), a microprocessor, or the like, or any combination thereof. For example, the digital calibration engine 520 is implemented as a state machine, a simple processor, a set of digital logic, or in any other suitable manner. The digital calibration engine 520 can be implemented separate from other components, and/or integrated with other components. For example, the digital calibration engine 520 can be a separate controller, processor, or other component; or the digital calibration engine 520 can be implemented using a same controller, processor, or other component being used to implement the bandgap controller 305.

Figure 6:
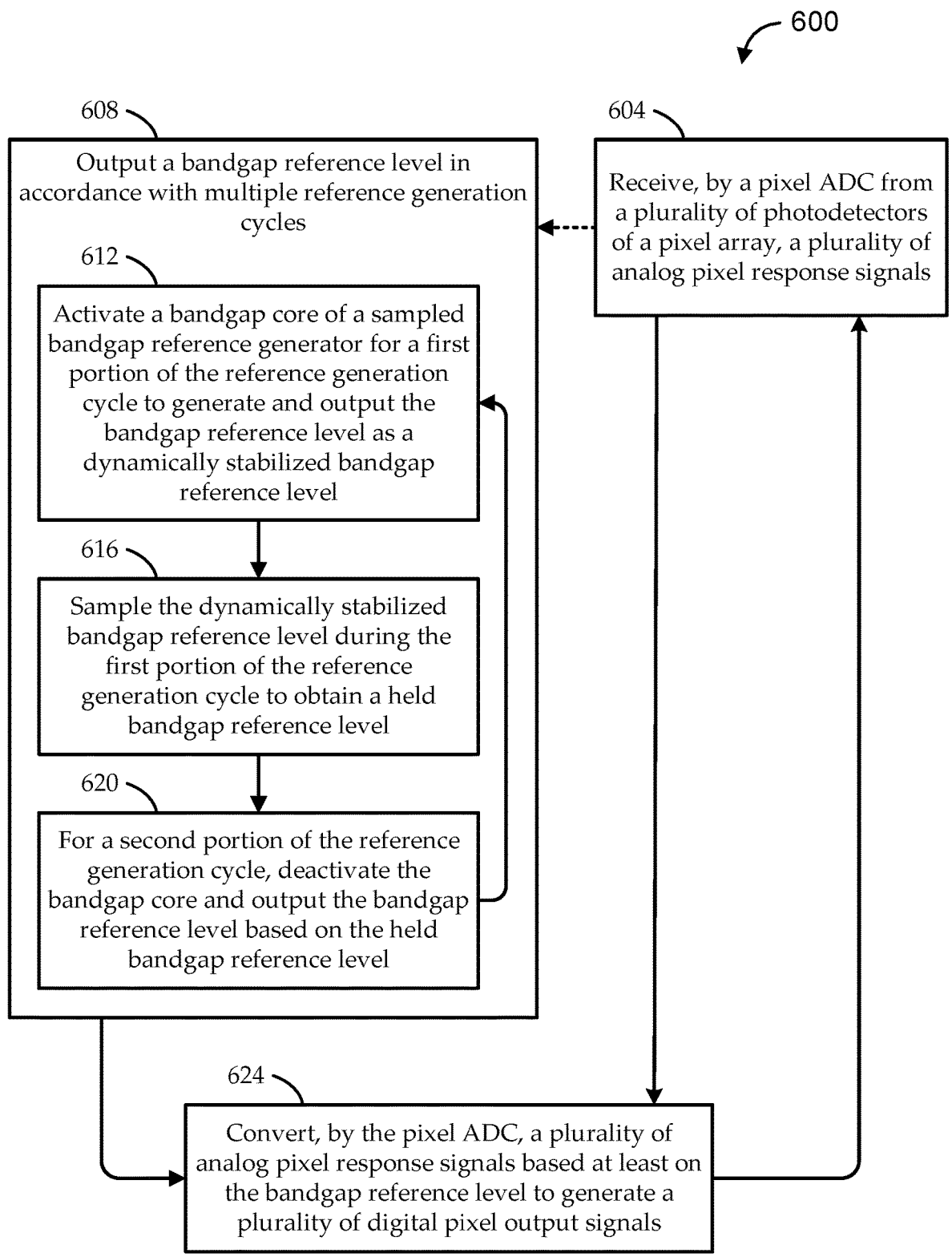
FIG. 6 shows a flow diagram of an illustrative method for pixel conversion in a CMOS image sensor, according to various embodiments.

FIG. 6 shows a flow diagram of an illustrative method 600 for pixel conversion in a complementary metal-oxide semiconductor (CMOS) image sensor, according to various embodiments. Embodiments of the method 600 can be performed using embodiments of CMOS image sensors that incorporate sampled bandgap reference generators, for example, as described herein with reference to FIGS. 2-5. Embodiments begin at stage 604 by receiving analog pixel response signals from photodetectors of a pixel array using a pixel analog to digital converter (ADC).

At stage 608, embodiments can output a bandgap reference level in accordance with multiple reference generation cycles (e.g., periodic cycles). The outputting at stage 608 can involve iterating through stages 612-620 in each cycle. At stage 612, embodiments can activate a bandgap core of a sampled bandgap reference generator for a first portion of the reference generation cycle to generate and output the bandgap reference level as a dynamically stabilized bandgap reference level. At stage 616, embodiments can sample the dynamically stabilized bandgap reference level during the first portion of the reference generation cycle to obtain a held bandgap reference level. At stage 620, for a second portion of the reference generation cycle, embodiments can deactivate the bandgap core and output the bandgap reference level based on the held bandgap reference level. In some embodiments, the deactivating the bandgap core at stage 620 can include forcing an output of the bandgap core to ground.

As described herein, the timing of the first and second portions of each reference generation cycle can be controlled by a controller. In some embodiments, the timing is consistent over all reference generation cycles (e.g., the cycles are periodic). In some implementations, for each of a plurality of reference generation cycles, the first portion consumes less than half of the reference generation cycle, and the second portion consumes greater than half of the reference generation cycle. For example, the bandgap core is only ON for fifty percent or less of each reference generation cycle.

In some embodiments, the sampling at stage 616 includes coupling a charge storage device to the dynamically stabilized bandgap reference level during the first portion of the reference generation cycle to charge the charge storage device. Subsequently (i.e., subsequent to the coupling and still prior to the end of the first portion of the reference generation cycle), the charge storage device is decoupled from the dynamically stabilized bandgap reference level, thereby sampling and holding the dynamically stabilized bandgap reference level on the charge storage device as the held bandgap reference level for the second portion of the reference generation cycle. For example, a capacitor is coupled with, then decoupled from, the output of the bandgap core to obtain and hold a sample of the dynamically stabilized bandgap reference level for use as the bandgap reference level in the second portion of the reference generation cycle (i.e., while the bandgap core is deactivated).

In other embodiments, during the entire reference generation cycle (i.e., during both the first and second portions), the outputting at stage 608 is via a digital to analog converter (DAC) that outputs the bandgap reference level based on a digital code provided by a digital calibration engine. In such embodiments, during the first portion of each reference generation cycle, the sampling at stage 616 can include comparing the bandgap reference level being output by the DAC (i.e., based on the present digital code being output by the digital calibration engine) and the dynamically stabilized bandgap reference level being output by the bandgap core. The digital code can then be updated (as needed) based on the comparing. For example, if changes in operating temperature, supply level, and/or other parameters has caused a shift in the DAC output (i.e., the bandgap reference level being output since a previous updating of the digital code) relative to the bandgap reference level that is being dynamically stabilized by the bandgap core, the digital calibration engine can adjust the digital code in an appropriate direction to recalibrate the DAC output to the bandgap core output while the bandgap core is active. Then, in the second portion of each reference generation cycle, the outputting the bandgap reference level based on the held bandgap reference level includes holding the digital code constant. In effect, during each second portion of the reference generation cycle, the bandgap reference level being output by the DAC is based on the level that was being output by the bandgap core in the preceding first portion of the reference generation cycle, and is not dynamically adjusted while the bandgap core is not active.

At stage 624, embodiments can convert (using the pixel ADC) at least some of the analog pixel response signals based at least on the bandgap reference level to generate corresponding digital pixel output signals. In some embodiments, the converting at stage 624 includes generating a ramp voltage based on the bandgap reference level, such that a ramp level of the ramp voltage begins at a starting level at a starting time and ramps to an ending level. A respective response level of each of the analog pixel response signals can then be compared with the ramp level. For each of the analog pixel response signals, a corresponding one of the plurality of digital pixel output signals can be generated based on measuring an amount of time between the starting time and a time at which the ramp level crosses the respective response level. For example, one or more digital counters is used to count elapsed clock cycles, or the like, and the count is used as a digital representation of the analog pixel response level.

In some embodiment, the outputting at stage 608 further includes buffering the bandgap reference level by a buffer at an output of the sampled bandgap reference generator, such that the pixel ADC receives the bandgap reference level from the buffer for use in conversion at stage 624. In some such embodiments, the buffering is by multiple buffers (e.g., unity buffers) to generate multiple instances of buffered bandgap reference levels. The pixel ADC can include multiple pixel ADCs, each coupled to a respective one of the plurality of buffers to convert a respective portion of the analog pixel response signals to generate a respective portion of the digital pixel output signals based at least on a respective one of the buffered bandgap reference levels. For example, each column of pixels in the pixel array can be coupled with a respective pixel ADC that performs the conversions for that column.

As shown in FIG. 6, various portions of the method 600 can be performed iteratively. Some embodiments include multiple independent iteration loops that can operate with independent timing, iteration frequency, etc. For example, iteration of stages 612, 616, and 620 can be considered as a sampling loop; and iteration of stages 604 and 624 can be considered as a pixel conversion loop. In some implementations, the sampling loop iterates once per some relatively large number of iterations of the pixel conversion loop. For example, the sampling loop is used to sample bandgap reference levels once, then several thousand pixel row conversions take place (corresponding to several thousand iterations of the pixel conversion loop) using the same samples of the bandgap reference levels. Subsequently, the sampling loop is used to obtain a new sample of the bandgap reference levels, followed by another several thousand pixel row conversions. As such, the sampling and conversion loops can be performed in parallel and with different timing, and can be periodically synchronized, as needed.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them. It will be understood that, although the terms "first," "second," "third," etc. may be used herein to describe various elements, components, these elements, components, regions, should not be limited by these terms. These terms are only used to distinguish one element, component, from another element, component. Thus, a first element, component, discussed below could be termed a second element, component, without departing from the teachings of the present invention. As used herein, the terms "logic low," "low state," "low level," "logic low level," "low," or "0" are used interchangeably. The terms "logic high," "high state," "high level," "logic high level," "high," or "1" are used interchangeably.

As used herein, the terms "a", "an" and "the" may include singular and plural references. It will be further understood that the terms "comprising", "including", having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A method for pixel conversion in a complementary metal-oxide semiconductor (CMOS) image sensor, the method comprising:
   receiving, by a pixel analog to digital converter (ADC) from a plurality of photodetectors of a pixel array, a plurality of analog pixel response signals;
   outputting a bandgap reference level by, for each of a plurality of reference generation cycles:
      activating a bandgap core of a sampled bandgap reference generator for a first portion of the reference generation cycle to generate and output the bandgap reference level as a dynamically stabilized bandgap reference level;
      sampling the dynamically stabilized bandgap reference level during the first portion of the reference generation cycle to obtain a held bandgap reference level; and
      for a second portion of the reference generation cycle, deactivating the bandgap core and outputting the bandgap reference level based on the held bandgap reference level; and
   converting, by the pixel ADC, the plurality of analog pixel response signals based at least on the bandgap reference level to generate a plurality of digital pixel output signals.

2. The method of claim 1, wherein the sampling comprises:
   coupling a charge storage device to the dynamically stabilized bandgap reference level during the first portion of the reference generation cycle to charge the charge storage device; and
   decoupling the charge storage device from the dynamically stabilized bandgap reference level during the first portion of the cycle subsequent to the coupling, thereby sampling and holding the dynamically stabilized bandgap reference level on the charge storage device as the held bandgap reference level for the second portion of the reference generation cycle.

3. The method of claim 1, wherein:
   the outputting, during both the first portion and the second portion of the reference generation cycle, is via a digital to analog converter (DAC) that outputs the bandgap reference level based on a digital code provided by a digital calibration engine;
   the sampling comprises comparing the bandgap reference level being output by the DAC and the dynamically stabilized bandgap reference level being output by the bandgap core, and updating the digital code based on the comparing; and
   the outputting the bandgap reference level based on the held bandgap reference level comprises holding the digital code constant during the second portion of the reference generation cycle.

4. The method of claim 1, wherein the outputting further comprises:
   buffering the bandgap reference level by a buffer at an output of the sampled bandgap reference generator, such that the pixel ADC receives the bandgap reference level from the buffer.

5. The method of claim 1, wherein:
   the outputting further comprises buffering the bandgap reference level by a plurality of buffers at an output of the sampled bandgap reference generator to generate a plurality of buffered bandgap reference levels;
   the pixel ADC comprises a plurality of pixel ADCs, each coupled to a respective one of the plurality of buffers to convert a respective portion of the plurality of analog pixel response signals to generate a respective portion of the plurality of digital pixel output signals based at least on a respective one of the buffered bandgap reference levels.

6. The method of claim 1, wherein the converting comprises:
   generating a ramp voltage based on the bandgap reference level, such that a ramp level of the ramp voltage begins at a starting level at a starting time and ramps to an ending level;
   comparing a respective response level of each of the plurality of analog pixel response signals with the ramp level; and
   generating, for each of the plurality of analog pixel response signals, a corresponding one of the plurality of digital pixel output signals based on measuring an amount of time between the starting time and a time at which the ramp level crosses the respective response level.

7. The method of claim 1, wherein deactivating the bandgap core comprises forcing an output of the bandgap core to ground.

8. The method of claim 1, wherein, for each of a plurality of reference generation cycles, the first portion consumes less than half of the reference generation cycle, and the second portion consumes greater than half of the reference generation cycle.

9. The method of claim 1, wherein the sampled bandgap reference generator and the pixel array are integrated on a same chip within sufficient proximity such that at least some photons emitted by the sampled bandgap reference generator during the first portion of the reference generation cycle are detectable by at least some of the plurality of photodetectors.

10. A complementary metal-oxide semiconductor (CMOS) image sensor system comprising:
    a pixel array having a plurality of photodetectors configured to output a plurality of analog pixel response signals indicative of detected intensities of illumination across the plurality of photodetectors;
    a pixel analog to digital converter (ADC) coupled with the pixel array to convert the plurality of analog pixel response signals a plurality of digital pixel output signals based at least on a bandgap reference level; and
    a sampled bandgap reference generator to output the bandgap reference level by, for each of a plurality of reference generation cycles:
       activating a bandgap core of the sampled bandgap reference generator for a first portion of the reference generation cycle to generate and output the bandgap reference level as a dynamically stabilized bandgap reference level;
       sampling the dynamically stabilized bandgap reference level during the first portion of the reference generation cycle to obtain a held bandgap reference level; and for a second portion of the reference generation cycle, deactivating the bandgap core and outputting the bandgap reference level based on the held bandgap reference level.

11. The CMOS image sensor system of claim 10, wherein the bandgap core comprises:
an operational amplifier having a supply node to couple the operational amplifier with a supply voltage, and having an output node to output the dynamically stabilized bandgap reference level;
a first switch to selectively couple the supply node with the supply voltage based on a first switching signal; and
a second switch to selectively couple the output node with ground based on a second switching signal that is complementary to the first switching signal.

12. The CMOS image sensor system of claim 11, wherein the sampled bandgap reference generator further comprises:
a bandgap controller to control operation of at least the first and second switching signals, such that:
the activating the bandgap core comprises controlling the first and second switching signals to couple the supply node with the supply voltage and to decouple the output node from ground; and
the deactivating the bandgap core comprises controlling the first and second switching signals to decouple the supply node from the supply voltage and to couple the output node with ground.

13. The CMOS image sensor system of claim 10, wherein:
the bandgap core comprises an output node at which the dynamically stabilized bandgap reference level is output during the first portion of the reference generation cycle;
the sampled bandgap reference generator comprises an analog sample and hold circuit having a charge storage device selectively coupled with the output node; and
the sampling comprises:
coupling the charge storage device to the output node during the first portion of the reference generation cycle to charge the charge storage device; and
decoupling the charge storage device from the output node during the first portion of the cycle subsequent to the coupling, thereby sampling and holding the dynamically stabilized bandgap reference level on the charge storage device as the held bandgap reference level for the second portion of the reference generation cycle.

14. The CMOS image sensor system of claim 10, wherein:
the sampled bandgap reference generator comprises a digital sample and hold circuit having a digital calibration engine and a digital to analog converter (DAC) that outputs the bandgap reference level based on a digital code provided by the digital calibration engine;
the sampled bandgap reference generator is to output the bandgap reference level during both the first portion and the second portion of the reference generation cycle via the DAC;
the sampling comprises comparing the bandgap reference level being output by the DAC and the dynamically stabilized bandgap reference level being output by the bandgap core, and updating the digital code based on the comparing; and
the outputting the bandgap reference level based on the held bandgap reference level comprises holding the digital code constant during the second portion of the reference generation cycle.

15. The CMOS image sensor system of claim 10, wherein:
the sampled bandgap reference generator comprises a buffering circuit to provide buffered output of the bandgap reference level, such that the pixel ADC receives the bandgap reference level via the buffered output.

16. The CMOS image sensor system of claim 10, wherein:
the sampled bandgap reference generator comprises a buffering circuit comprising a plurality of buffers, each having a respective buffered output corresponding to the bandgap reference level; and
the pixel ADC comprises a plurality of pixel ADCs, each coupled to a respective buffered output of one of the plurality of buffers to convert a respective portion of the plurality of analog pixel response signals to generate a respective portion of the plurality of digital pixel output signals based at least on the respective buffered output.

17. The CMOS image sensor system of claim 10, wherein the pixel ADC is to convert by:
generating a ramp voltage based on the bandgap reference level, such that a ramp level of the ramp voltage begins at a starting level at a starting time and ramps to an ending level;
comparing a respective response level of each of the plurality of analog pixel response signals with the ramp level; and
generating, for each of the plurality of analog pixel response signals, a corresponding one of the plurality of digital pixel output signals based on measuring an amount of time between the starting time and a time at which the ramp level crosses the respective response level.

18. The CMOS image sensor system of claim 10, wherein deactivating the bandgap core comprises forcing an output of the bandgap core to ground.

19. The CMOS image sensor system of claim 10, wherein, for each of a plurality of reference generation cycles, the first portion consumes less than half of the reference generation cycle, and the second portion consumes greater than half of the reference generation cycle.

20. The CMOS image sensor system of claim 10, further comprising:
an integrated circuit substrate having the sampled bandgap reference generator and the pixel array integrated thereon within sufficient proximity such that at least some photons emitted by the sampled bandgap reference generator during the first portion of the reference generation cycle are detectable by at least some of the plurality of photodetectors.

* * * * *